(12) United States Patent
Schlippe et al.

(10) Patent No.: US 10,043,519 B2
(45) Date of Patent: Aug. 7, 2018

(54) GENERATION OF TEXT FROM AN AUDIO SPEECH SIGNAL

(71) Applicant: Tim Schlippe, Ettlingen (DE)

(72) Inventors: Tim Schlippe, Ettlingen (DE);
Matthias Woelfel, Karlsruhe (DE);
Angelo Stitz, Pforzheim (DE)

(73) Assignee: Tim Schlippe, Ettlingen (DE)

( * ) Notice: Subject to any disclaimer, the term of this patent is extended or adjusted under 35 U.S.C. 154(b) by 0 days.

(21) Appl. No.: 15/255,946

(22) Filed: Sep. 2, 2016

(65) Prior Publication Data
US 2018/0068662 A1    Mar. 8, 2018

(51) Int. Cl.
*G10L 15/26*    (2006.01)
*G10L 25/90*    (2013.01)
*G10L 15/187*    (2013.01)

(52) U.S. Cl.
CPC ............ *G10L 15/26* (2013.01); *G10L 15/187* (2013.01); *G10L 25/90* (2013.01)

(58) Field of Classification Search
CPC ......... G10L 21/06; G10L 15/26; G10L 15/02; G10L 15/1807; G10L 25/63; G10L 15/08; G06F 17/2765
See application file for complete search history.

(56) References Cited

U.S. PATENT DOCUMENTS

| | | | | |
|---|---|---|---|---|
| 9,728,189 B2* | 8/2017 | Fujibayashi | ............ | G10L 15/24 |
| 2011/0276327 A1* | 11/2011 | Foxenland | .............. | G10L 15/26 |
| | | | | 704/235 |
| 2014/0052441 A1* | 2/2014 | Fujibayashi | .......... | G06F 17/241 |
| | | | | 704/231 |
| 2014/0236596 A1* | 8/2014 | Martinez | ............. | G06F 17/2785 |
| | | | | 704/235 |

(Continued)

OTHER PUBLICATIONS

Woelfel, et al., "Voice Driven Type Design", Conference Paper, Oct. 2015, 10 pages.

(Continued)

*Primary Examiner* — Douglas Godbold
*Assistant Examiner* — Mark Villena
(74) *Attorney, Agent, or Firm* — Brake Hughes Bellermann LLP

(57) ABSTRACT

In one general aspect, a computer-implemented method for text generation based on an audio speech signal can include receiving the audio speech signal, extracting acoustic feature values of the speech signal at a predefined sampling frequency, mapping written words of a transcription of the audio speech signal to the units of the corresponding pronunciation objects, segmenting the audio speech signal including mapping the units of corresponding pronunciation objects to the received audio speech signal to determine a beginning time and an end time of the mapped units, aligning one or more units of the corresponding pronunciation objects to one or more graphemes based on a unit- (Continued)

grapheme mapping, determining a speed parameter for each aligned grapheme, determining acoustic parameters for each aligned grapheme, and generating, for each character of the aligned graphemes, a character shape representative of the speed parameter and the acoustic parameters associated with the respective grapheme.

20 Claims, 8 Drawing Sheets

(56) References Cited

U.S. PATENT DOCUMENTS

2016/0379624 A1* 12/2016 Fujimura .............. G10L 15/183
704/235

OTHER PUBLICATIONS

Kisler et al., "Signal processing via web services: the use case WebMAUS", Conference Paper, Jan. 2012, retrieved from https://www.researchgate.net/publication/248390251, 7 pages.

Woelfel et al., "Distant Speech Recognition", John Wiley and Sons, Ltd., 2009, pp. 1-60.

Wu et al. "Acoustic Feature Analysis in Speech Emotion Primitives Estimation", Interspeech 2010, Sep. 26-30, 2010, Makuhari, Chiba, Japan, pp. 785-788.

Darch et al., "Analysis and prediction of acoustic speech features from mel-frequency cepstral coefficients in distributed speech recognition architectures", J. Acoust. Soc. Am. 124:6, Dec. 2008, pp. 3989-4000.

* cited by examiner 1. derive acoustic features, phonemes and graphemes
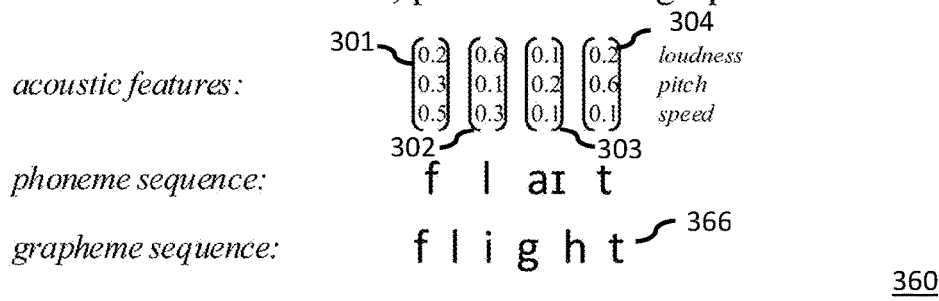
360
2. align phonemes to graphemes
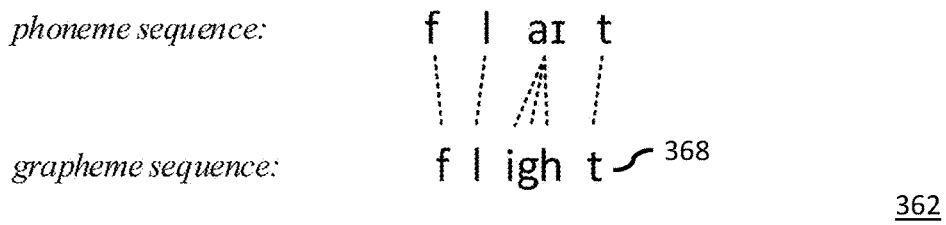
362
3. map acoustic to visual features
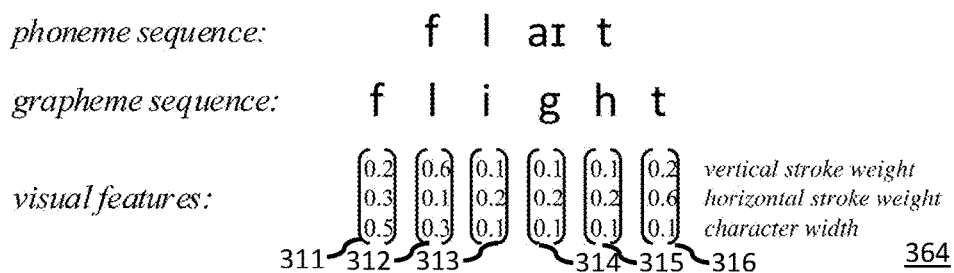
364
FIG. 3B 801 — Basis font without any characteristica Sei ruhig, bleibe ruhig, mein Kind 802 — Fonts with different characteristica 820 — [1] Sei ruhig, bleibe ruhig, mein Kind
822 — [2] Sei ruhig, bleibe ruhig, mein Kind 810 — More pitch + loudness    811 — More pitch 824 — [3] Sei ruhig, bleibe ruhig, mein Kind
826 — [4] Sei ruhig, bleibe ruhig, mein Kind

812 — Less loudness

828 — [5] Sei ruhig, bleibe ruhig, mein Kind
830 — [6] Sei ruhig, bleibe ruhig, mein Kind 813 — Less speed 832 — [7] Sei ruhig, bleibe ruhig, mein Kind
834 — [8] Sei ruhig, bleibe ruhig, mein Kind

FIG. 8

GENERATION OF TEXT FROM AN AUDIO SPEECH SIGNAL

TECHNICAL FIELD

This description generally relates to speech-to-text conversion.

BACKGROUND

In current speech-to-text conversion tools, the shape of a single typographical character is treated as an unchangeable property of the character visualization. What is spoken, therefore, can be visualized by identifying and visualizing the characters encoded in an audio speech signal. However, information about how something is spoken may not be visualized by the corresponding character representations of the audio speech signal.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method for text generation based on an audio speech signal can be executed by one or more processors of a computer system. The method can include receiving, by the computer system, the audio speech signal, extracting acoustic feature values of the audio speech signal at a predefined sampling frequency, mapping written words of a transcription of the audio speech signal to units of corresponding pronunciation objects, segmenting the audio speech signal including mapping the units of corresponding pronunciation objects to the received audio speech signal to determine a beginning time and an end time of the mapped units, aligning one or more units of the corresponding pronunciation objects to one or more graphemes based on a unit-grapheme mapping, determining a speed parameter for each aligned grapheme by using the beginning time and the end time of the corresponding aligned one or more of the units of the corresponding pronunciation objects, determining at least one acoustic parameter for each aligned grapheme including averaging the extracted acoustic feature values according to the beginning time and the end time of the corresponding aligned one or more units of the corresponding pronunciation objects, and generating, for each character of the aligned graphemes, a character shape representative of the speed parameter, a character shape representative of the at least one acoustic parameter associated with the respective grapheme, or a character shape representative of the speed parameter and the at least one acoustic parameter associated with the respective grapheme.

In further implementations, a computer program product when loaded into a memory of the computer system and executed by at least one processor of the computer system causes the computer system to execute the steps of a respective computer implemented method for performing the above described functions of the computer system.

In another general aspect, a computer system for text generation based on an audio speech signal can include an interface component including an audio interface and a transcription interface, the interface component configured to receive the audio speech signal via the audio interface and configured to receive a transcription of the audio speech signal via the transcription interface, a feature extraction component configured to extract acoustic feature values of the audio speech signal at a predefined sampling frequency, a segmentation component configured to map written words of the transcription of the audio speech signal to units of corresponding pronunciation objects, and configured to segment the audio speech signal including mapping the units of corresponding pronunciation objects to the received audio speech signal to determine a beginning time and an end time of the mapped units, a grapheme alignment component configured to align one or more units of corresponding pronunciation objects to one or more graphemes based on a unit-grapheme mapping, and a parameter determination component. The parameter determination component configured to determine a speed parameter for each aligned grapheme by using the beginning time and the end time of the corresponding aligned one or more of the units of corresponding pronunciation objects, and determine at least one acoustic parameter for each aligned grapheme including averaging the extracted acoustic feature values according to the beginning time and the end time of the corresponding aligned one or more units of corresponding pronunciation objects. The computer system can further include a generator component configured to generate, for each character of the aligned graphemes, a character shape representative of the speed parameter, a character shape representative of the at least one acoustic parameter associated with the respective grapheme, or a character shape representative of the speed parameter and the at least one acoustic parameter associated with the respective grapheme.

Example implementations outlined above and disclosed herein may include one or more of the following features. For instance, determining the at least one acoustic parameter can further include normalizing a plurality of acoustic parameters by applying respective acoustic normalization functions. Determining the speed parameter can further include normalizing the speed parameter by applying a speed normalization function. Generating the character shape can further include determining visual shaping parameters based on the normalized speed and acoustic parameters. The visual shaping parameters can include at least one of a vertical stroke weight, a horizontal stroke weight, a character width, a character height, a character contrast, a character sharpness, a character color, or a character skewness. The plurality of acoustic parameters can include a loudness parameter, a pitch parameter, or a loudness parameter and a pitch parameter. Generating the character shape can further include any one of the following: in comparison with a reference character shape, increasing the vertical stroke weight of the character shape with increasing loudness parameter values; in comparison with the reference character shape, increasing the horizontal stroke weight of the character shape with raising pitch parameter values; and in comparison with the reference character shape, reducing the character width of the character shape with increasing speed parameter values. Generating the character shape can further include processing, in real-time, a continuously scalable character in accordance with the visual shaping parameters. Processing the continuously scalable character can occur within predefined allowed value ranges for each visual shaping parameter. The unit-grapheme mapping can be selected from one of a one-to-one mapping, a p-to-one mapping, a one-to-g mapping, and a p-to-g mapping, and wherein p and g are integer values greater than one. Aligning one or more units of the corresponding pronunciation objects to one or more graphemes based on a unit-grapheme mapping can further include performing an automatic forced alignment process by aligning one particular unit to one or more corresponding graphemes, where the maximum number of corresponding graphemes is limited to a predefined integer. Transforming at least one of acoustic parameters or the speed parameter of the one particular unit into visual shaping parameters of the one or more corresponding graphemes can precede generating the character shape. For instance, the computer system can further include a display component configured to output a visual representation of the generated character shapes. The parameter determination component can be further configured to normalize a plurality of acoustic parameters by applying respective acoustic normalization functions, normalize the speed parameter by applying a speed normalization function, and determine visual shaping parameters based on the normalized speed and acoustic parameters. Generating, for each character of the aligned graphemes, a character shape can include generating, for each character of the aligned graphemes, a character shape representative of the speed parameter. Generating, for each character of the aligned graphemes, a character shape can include generating, for each character of the aligned graphemes, a character shape representative of the at least one acoustic parameter associated with the respective grapheme. Generating, for each character of the aligned graphemes, a character shape can include generating, for each character of the aligned graphemes, a character shape representative of the speed parameter and the at least one acoustic parameter associated with the respective grapheme.

Implementations can provide any or all of the following advantages for improving the functioning of a speech-to-text-conversion computer system. A first advantage can enhance a function of a display of a character representation of one or more audio speech signals to reflect properties or features of the one or more audio speech signals for indicating how something is spoken. For example, how something is spoken can be reflective of an emotional state of the individual speaking. Someone who is excited may speak more quickly than someone who is calm. Someone who is scared or frightened may speak louder and faster than someone who is calm and relaxed. An advantage of an improved flexibility of computerized speech-to-text conversion can be the offering of text to a user of a computer system that includes information related to the emotions of speech when it was spoken. The display function can provide the information about the text to a user of the computer system. For example, the informative about the text can be provided by the computer system and to a user who may be hearing impaired. The informative about the text can be provided by the computer system and to a user for language learning. The informative about the text can be provided by the computer system and for display to a user for use in subtitles or e-books. In some implementations described herein, the providing of informative about the text by the computer system and to a user can be achieved by flexible character representations, which can be adjusted to acoustic metadata encoded in the audio speech signal. In further embodiments, a computer program product when loaded into a memory of the computer system and executed by at least one processor of the computer system causes the computer system to execute the steps of a respective computer implemented method for performing the above described functions of the computer system.

Further aspects of implementations disclosed herein will be realized and attained by means of the elements and combinations particularly depicted in the appended claims. It is to be understood that both the foregoing general description and the following detailed description are exemplary and explanatory only and are not restrictive of the implementations as described.

The details of one or more implementations are set forth in the accompanying drawings and the description below. Other features will be apparent from the description and drawings, and from the claims.

BRIEF DESCRIPTION OF THE DRAWINGS

FIG. 3B is a diagram that illustrates an example of a transformation of acoustic (speed) features into visual features.

FIG. 8 is a diagram that illustrates examples of visual representations of acoustic/speed features.

Like reference symbols in the various drawings indicate like elements.

DETAILED DESCRIPTION

Figure 1:
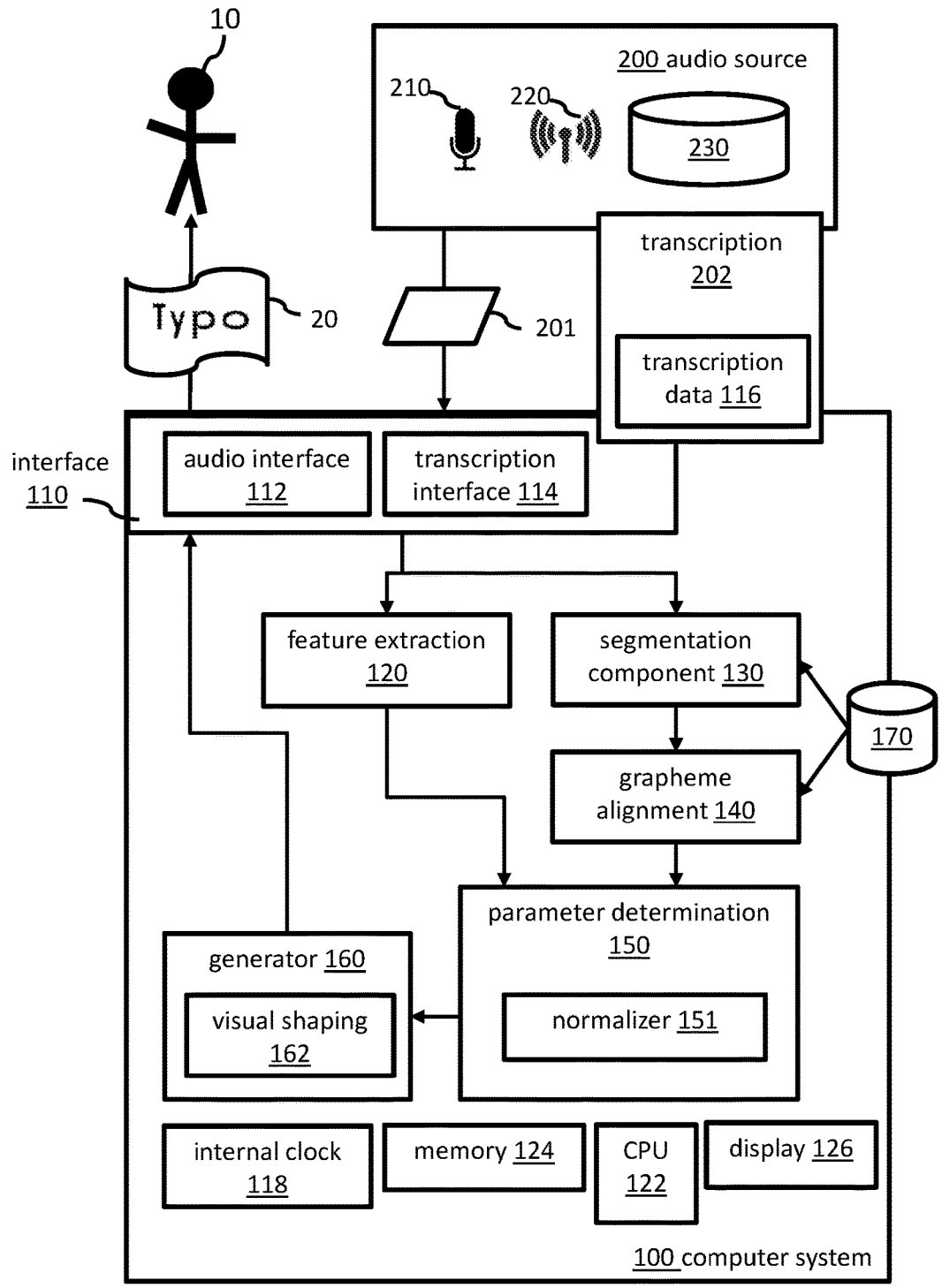
FIG. 1 is a block diagram of an example computer system for text generation based on an audio speech signal.

Example implementations described herein can provide a computer system, a computer implemented method, and a corresponding computer program for text generation based on an audio speech signal. An audio speech signal can be defined as an audio signal including encoded speech during a certain period of time. The encoded speech signals may also originate from multiple speakers. The audio speech signal may also be referred to as a speech signal.

In some implementations, a computer system receives an audio speech signal and a transcription in text form. The transcription is a text representation of the spoken language encoded in the audio speech signal. The content of the text representation may be simplified or reduced compared to the original content conveyed with the audio speech signal.

The audio speech signal can be received via an audio interface of the computer system. The audio interface can be adapted to (configured to) receive any audio signal. The audio signal can be generated from various input signals. Example input signals can include, but are not limited to, a direct microphone signal, a satellite signal, a television (TV) signal, a digital video disk/compact disk (DVD/CD) signal, and a Blu-ray disc signal. Example input signals may also be included in and/or received from an audiobook, be part of an audio file, be received over the Internet, be received from a streaming service, or be received by a storage device.

The transcription can be predefined or may be generated by an automatic speech recognition (ASR) system. For example, an ASR system can be part of one or more components that provide the audio speech signal. In another example, an ASR system can be an integral part of a computer system. In yet another example, an ASR system can be provided as a separate component located between an audio source and a computer system. The ASR system can provide an interface between the audio source and the computer system.

A transcription can be received by a computer system through an interface configured to receive text information in any format. The transcription can include, for example, graphemes, punctuation marks, and space characters. A grapheme functions as a representation of a written character of a particular language (e.g., a symbol). It is the smallest unit of the writing system of a language. Each individual grapheme may or may not carry meaning by itself. Each individual grapheme may or may not correspond to a single phoneme of a spoken language. Example graphemes can include, but are not limited to, alphabetic letters, typographic ligatures, Chinese characters, Hangul characters, Arabic characters, Cyril characters, numerical digits, punctuation marks, and other individual symbols. Stated in another way, a grapheme can be a symbol that functions as a character in a specific language's written tradition (orthography). In most cases, a grapheme can represent (is a symbol for) a single character. In some cases, however, a grapheme can represent two or more characters. In some cases, a grapheme can represent a character and an associated accent mark. For example, in Spanish "ch" is considered a single unit, so a single grapheme is used in Spanish to represent "ch". In English, however, "ch" may not be considered a single unit, so a grapheme that represents "c" is used along with another grapheme that represents "h". In another example, referring to the alphabet for Northern Sami, "á" is sorted and counted separately, and represented with a grapheme different from the grapheme used to represent "a". In Danish, however, because "á" is just considered a variant of "a", the same grapheme is used to represent both characters. In some implementations, a transcription can be in the original language of the audio speech signal. In some implementations, a transcription can be a translation of an initial transcription. In some implementations, a transcription can vary, to a certain extent, from the words uttered in the original audio speech signal.

The computer system can further include a feature extraction component configured to extract acoustic feature values of a speech signal at a predefined sampling frequency. In some implementations, a sampling interval in the range of about ten milliseconds may be used. The approximate ten millisecond sampling rate can be an advantageous setup between frequency and time resolution. For example, acoustic features can include, but are not limited to, loudness, pitch, articulatory features (e.g. unrounded vs. rounded lips, nasal, plosive, fricative), speech variability, Mel frequency cepstral coefficients (MFCC), warped minimum variance distortionless response (warped-MVDR), perceptual linear prediction (PLP), duration, waveform, periodic and aperiodic speech sounds, vocal tract resonances, formants, voice quality, timbre, and other properties of the speech signal's frequency spectrum and cepstrum. In some implementations, acoustic feature extractors can extract these features at a first level of abstraction. In some implementations, acoustic feature extractors can extract features at a second or higher level of abstraction, such as for example, a phoneme level, a syllable level, or a word level. Examples of these higher level acoustic features can include, but are not limited to, a level of accent (e.g., defined by the distance to representative example phonemes), a contraction, or a language which is spoken. In some cases, speech analysis literature can refer to a speed (of speech) as an acoustic feature. However, as described herein, a speed (of speech) is treated as a separate acoustic feature or parameter of the speech. The speed parameter may also be referred to as a duration parameter because the speed parameter can describe how much time is spent on a particular portion of a spoken language (e.g., a character, a syllable, an entire word, a sentence, a paragraph, etc.).

The computer system can further include a segmentation component. The segmentation component can automatically segment the speech signal based on units of pronunciation objects that are spoken in the utterance of the speech signal. A unit of a pronunciation object can be a phoneme, a syllable, a word, or any portion of an utterance that can be associated with a meaningful pronunciation description. The inputs to the segmentation component are the speech signal and a transcription of the speech signal that includes written words that are part of the spoken language encoded by the speech signal. The output of the segmentation component can be a sequence of pronunciation object units together with associated beginning and end times for each of the respective pronunciation object units.

The segmentation component can map the written words of the transcription to the corresponding pronunciation object units. For example, the segmentation component can use a pronunciation dictionary to map written units to the respective words. Thereby, the segmentation component can generate a sequence of one or more units. With a word-by-word transfer of written words to written units, the first and last unit of the respective words can receive a tag, which saves the corresponding word boundary information. Word boundary information can also be denoted in the unit sequences of the pronunciation objects in the pronunciation dictionary. Further, the segmentation component can align the units to the received audio speech signal (i.e., segments the audio signal into segments based on the aligned units). For example, the segmentation component can automatically segment the audio speech signal by mapping the corresponding units to the received audio speech signal.

As the speech signal evolves over time, the beginning and end times of the mapped units can be determined by the computer system using an internal clock included in the computer system. Based on the mapping between the units and the speech signal, and the time information from the internal clock, the segmentation component can determine the beginning and end times of the words that are aligned with the corresponding units. Aligning the units to the speech signal may be based on, for example, an automatic forced alignment process. The segmentation component can work independently of the feature extraction component. For example, feature extraction and segmentation component can run in parallel. Examples of units can include, but are not limited to, phonemes, or other units that can be used for the segmentation of the speech signal and for receiving the time information, such as, for example, graphemes, syllables, morphemes, other part of words, complete words, or sequences of words. For example, for languages with a close grapheme-phoneme relationship, using graphemes instead of phonemes may result in skipping the next grapheme alignment step.

A grapheme alignment component of the computer system can receive the aligned units from the segmentation component. A grapheme alignment component of the computer system can be adapted to automatically align one or more aligned units to one or more graphemes based on a unit-grapheme mapping. Different unit-grapheme mapping types can be supported. For example, a one-to-one mapping type, a p-to-one mapping type, a one-to-g mapping type, and a p-to-g mapping type, where p and g are integer values greater than one, can be possible unit-grapheme mappings based on implementations described herein. Different unit-grapheme mapping types can support different languages. In some implementations, a unit-grapheme mapping may be pre-defined in a corresponding mapping data structure (e.g., a pronunciation dictionary). In some implementations, an automatic forced alignment process may dynamically generate a unit-grapheme mapping with the unit sequence and the transcription as input.

A parameter determination component of the computer system can be adapted to determine a speed (or duration) parameter for each mapped grapheme by using the beginning and end times of the corresponding aligned one or more units. For example, the beginning and end times of each identified unit can be identified using the segmentation component. After the unit-grapheme alignment for each mapped grapheme (and for any sequence of graphemes) has been determined, the beginning and end times for the respective grapheme(s) can be determined through the corresponding unit-grapheme mapping. Consequently, the speed parameter can be computed for each grapheme (or sequence of graphemes) as a grapheme rate per given time interval.

The parameter determination component can receive the extracted acoustic feature values from the feature extraction component. The parameter determination component can be further configured to determine one or more acoustic parameters for each mapped grapheme by averaging the extracted acoustic feature values according to the beginning and end times of the corresponding aligned one or more units. The acoustic parameters as well as the speed parameter can also rely on the information of the adjacent units. The times associated to the received acoustic feature values are known by the computer system using information and data provided by an internal clock included in the computer system. Therefore, the correspondence between the acoustic feature values, the beginning times, and the end times of the respective units can be determined. Averaging as described herein can include weighted averaging. For example, a weighted average can be an average in which each quantity to be averaged is assigned a weight. These weightings can determine the relative importance of each quantity on the average, including mean, median and further functions to compute a weighted average.

The generator component of the computer system can be configured to generate, for each character of the mapped graphemes, a character shape that represents the speed parameter and/or the acoustic parameters of the respective grapheme.

In some implementations, the computer system may include or may be communicatively coupled (e.g., via the interface component) with input/output means including a visualization device (e.g., a display (a display device)) adapted to output a visual representation of the generated character shapes.

In some implementations, the parameter determination component can be further adapted to normalize the acoustic parameters by applying respective acoustic normalization functions when determining the acoustic parameters. The parameter determination component may be adapted to normalize the speed parameter by applying a speed normalization function when determining the speed parameter. In these implementations, visual shaping parameters may be determined based on the normalized speed and acoustic parameters. For example, the visual shaping parameters may include, but are not limited to, vertical stroke weight, horizontal stroke weight, character width, character height, character contrast, character sharpness, character color, and character skewness.

In some implementations, the acoustic parameters may include, for example, a loudness parameter or a pitch parameter. Generating the character shape may include increasing, in comparison to a reference character shape, the vertical stroke weight of the character shape with increasing loudness parameter values, and/or increasing, in comparison to the reference character shape, the horizontal stroke weight of the character shape with raising pitch parameter values, and/or reducing, in comparison to the reference character shape, the character width of the character shape with increasing speed parameter values.

In some implementations, the generating of the character shape may include processing, in quasi-real-time, a continuously scalable character in accordance with the visual shaping parameters. For example, "near real-time" or "quasi real-time" as used herein can refer to real-time processing with delays arising from the use of digital technology. Any digital data processing step (e.g., an image processing step) applied to data captured from the real world (e.g., the digital transformation of audio signals into visual representations) can result in a delay imposed by the digital data processing steps. For example, real-time processing can relate to a situation where the delay for displaying a particular word after it is spoken (vocalized) is only a fraction of the time interval it takes to vocalize the word. The term "real-time" is used herein when referring to such "near real-time" behavior of the disclosed implementations.

In some implementations, the processing of the continuously scalable character(s) occurs within predefined allowed value ranges for each visual shaping parameter.

In some implementations, the automatic alignment may include performing an automatic forced alignment process (e.g. by a Viterbi alignment) by aligning one particular unit to one or more corresponding graphemes. The maximum number of corresponding graphemes can be limited to a predefined integer. Transforming one or more acoustic parameters and/or the speed parameter of the one particular unit into visual shaping parameters of the one or more corresponding graphemes may precede generating the character shape.

FIG. 1 includes a block diagram of an example computer system 100 for text generation based on an audio speech signal. The computer system 100 is configured to execute a computer-implemented method 1000, which is visualized as a flowchart in FIG. 2. The computer system 100 will be described in the context of the computer-implemented method 1000 and corresponding reference numbers of both figures are used in the following joint description of FIGS. 1 and 2. In the following description, by way of example, phonemes are used as units of pronunciation objects.

The computer system 100 can include one or more processors (e.g., a central processing unit (CPU) 122) and one or more memory devices (e.g., a memory 124)). The methods and processes described herein can be performed on the computer system 100 using the CPU 122 and the memory 124. The computer system 100 includes a display 126 (a display device, a display component). The display 126 can display information and data for use in text generation based on an audio speech signal. The display 126 can display user interfaces (e.g., graphical user interfaces) for use by a user when the computer system 100 performs the text generation.

The computer system 100 includes an interface 110 that is configured to allow the computer system 100 to communicate with entities external to the computer system 100. The interface 110 includes an audio interface 112 configured to receive audio speech signal(s) (audio speech signal data) 201. The interface includes a transcription interface 114 configured to receive transcription(s) (transcription data) 116 in text form.

The audio speech signal(s) 201 are provided by an audio source 200 that is communicatively coupled (interfaced to) to the interface 110. The transcription(s) 116 are provided by a transcription source 202 that is communicatively coupled to the interface 110. In other words, the audio source 200 can provide the audio speech signal data 201 to the interface 110 via appropriate wireless communication means or via a wired connection. Any electronic communication standard that is appropriate to transfer audio data from one entity to another entity can be used. For example, an audio speech signal may originate from a direct microphone 210 input. For example, an audio speech signal may also be retrieved from a satellite/TV 220 signal. For example, an audio speech signal may also be provided from an audio file 230. The audio file may be included on and provided by a DVD/CD or Blu-ray player, an audiobook, over the Internet, by a streaming service, or by a storage device. The transcription source 202 can provide the transcription data 116 to the interface 110, and specifically to the transcription interface 114.

Figure 2:
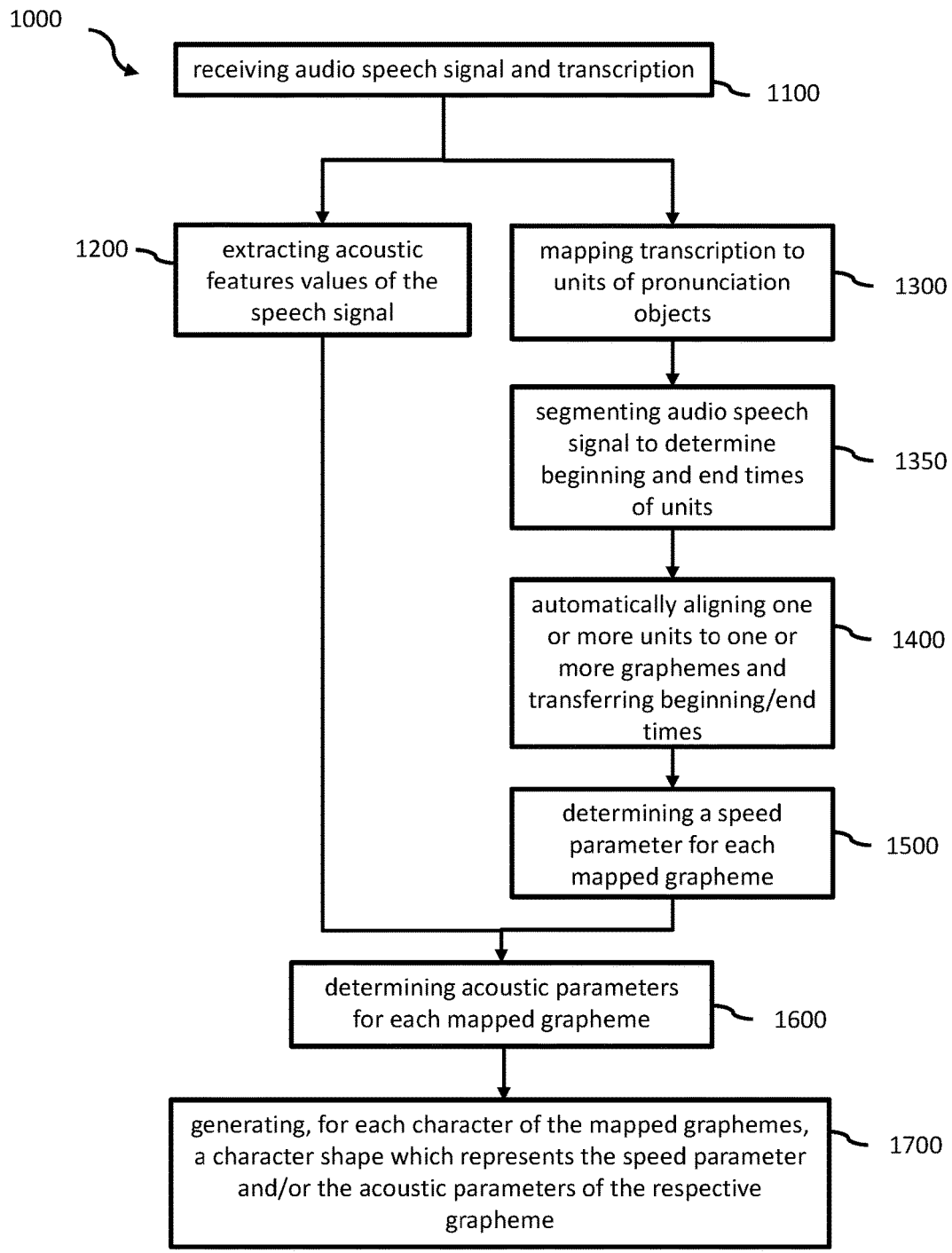
FIG. 2 is a flowchart of a computer-implemented method for text generation based on an audio speech signal.

Referring to FIG. 2, audio speech signal(s) and transcription(s) are received (block 1100).

In some implementations, the transcription source 202 may be implemented on the same device as the audio source 200 (e.g., in the case of an audio book or in the case of a TV signal including sub-titles). In some implementations, as shown in FIG. 1, a transcription source (e.g., the transcription source 202) can be a separate tool that is not part of the computer system 100. The transcription source can provide an interface between the audio source 200 and the computer system 100. For example, an automatic speech recognition tool (or system) may dynamically generate transcription data from spoken language that may be recorded through the microphone 210, encoded in the satellite/TV signal 220, or provided as the audio file 230 by a respective audio player. In some implementations, the transcription source 202 may be provided by (included in) the computer system 100. For example, an automatic speech recognition tool may also be implemented as an integrated component of the computer system 100.

The transcription (transcription data (e.g., transcription data 116)) can be predefined or may be generated by an automatic speech recognition (ASR) system. The transcription is in text form. The text form can include graphemes, punctuation marks, space characters etc. In some cases, a transcription can be in the original language of the language encoded in the audio speech signal(s) 201. In some cases, a transcription can be a translation of the transcription in the original language of the language encoded in the audio speech signal(s) 201. In addition or in the alternative, the transcription can vary from the words uttered in the speech signal. For example, sub-titles transmitted via TV signals can provide a simplification of the original spoken language in the audio speech signal. For example, in such a simplified transcription, some words of the original spoken language may be omitted in the text representation of the simplified transcription. For example, a simplified transcription may be a reduced text representation of the original spoken language where some parts of the original spoken words are not represented in the written transcription.

The audio speech signal(s) 201 received by the audio interface 112 are routed to (provided to) a feature extraction component 120 and to a segmentation component 130. The signal processing performed by the feature extractor 120 and the segmentation component 130 can be performed independently and in parallel to one another.

Referring to FIG. 2, the feature extractor 120 extracts acoustic features values of the audio speech signal(s) (block 1200). The feature extractor extracts the acoustic features values at a predefined sampling frequency (e.g., in the range of 10 milliseconds). Acoustic features can include, but are not limited to, loudness, pitch, emotion, tones (e.g., the four tones of Chinese), voice activity, and silence.

The segmentation component 130 segments the audio speech signal(s) 201 into units, such as for example phoneme(s), together with the beginning and end times of each phoneme. The segmentation component 130 may use or include a pronunciation dictionary 170 that provides a mapping between the phonemes and the words of the transcription.

Referring to FIG. 2, the transcription is mapped to units of pronunciation objects (block 1300). For example, mapping the transcription (e.g., transcription data 116) to phonemes can be performed according to (based on) the mapping information provided by the dictionary 170. With a word-by-word mapping of written words to written phonemes, a first phoneme and last phoneme associated with each word can receive a tag that saves the word boundary information. Word boundary information can also be denoted in the phoneme sequences of the pronunciation objects in the pronunciation dictionary 170. The segmentation component can map the phonemes to the corresponding received audio speech signal (e.g., the audio speech signal(s) 201). Time points associated with the chronological sequence of the speech signal are known by the computer system 100 through the use of (interface to) an internal clock 118.

Referring to FIG. 2, the audio speech signal is segmented to determine a beginning time and an end time of the units (block 1350). Based on the mapping between the phonemes and the signal, and based on the time information from the internal clock, the segmentation component 130 can segment the audio speech signal to determine the beginning and end times of each aligned phoneme. Based on the identification of the word boundaries by the segmentation component 130, the segmentation component 130 can also determine the beginning and end times of each mapped word.

In some cases, the transcription (e.g., transcription data 116) can be predefined (e.g., provided in subtitles or ebooks, etc.). In some cases, the transcription (e.g., transcription data 116) can be automatically generated using automatic speech recognition as described herein. In some cases, the transcription (e.g., transcription data 116) can be in the original language of the language encoded in the audio speech signal. In some cases, the transcription can be a translation of an original transcription. In some cases, the transcription can vary from the words uttered in the audio speech signal to some degree or extent, resulting in a simplified transcription.

Aligning the phonemes to the audio signal may be based on an automatic forced alignment process. For example, the Munich Automatic Segmentation System (MAUS) may be used to generate a phoneme sequence in accordance with a given a transcription, and to determine in the received audio speech signal the beginning and end times of the respective phonemes based on the audio data.

Referring to FIG. 2, one or more units of the corresponding pronunciation objects are automatically aligned to one or more graphemes based on a predefined phoneme-grapheme mapping and a respective start (beginning) and end time (block 1400). The generated phonemes together with their respective start (beginning) and end times are provided to an alignment component 140 to automatically align each phoneme or phoneme sequence to one or more graphemes based on a predefined phoneme-grapheme mapping. For example, graphemes represent the written representation of the respective phonemes in the corresponding language. Thereby, a particular grapheme may include one or more characters. The relationship between graphemes and phonemes can vary among different languages. The dictionary 170 may also provide mappings for multiple languages to the grapheme alignment component 140. Languages with alphabetic scripts can be characterized by four types of relationships between phonemes and graphemes that can be modeled by respective mappings. The pre-defined phoneme-grapheme mapping may be a one-to-one mapping in which case one phoneme corresponds to exactly one grapheme. The pre-defined phoneme-grapheme mapping may be a p-to-one mapping in which case a sequence of phonemes is mapped to a single grapheme. The predefined phoneme-grapheme mapping may be a one-to-g mapping in which case a single phoneme is mapped to multiple graphemes. The pre-defined phoneme-grapheme mapping may be a p-to-g mapping, where multiple (p) phonemes are mapped to multiple (g) graphemes. In some cases where there is a close grapheme-to-phoneme relationship, such as for example in Spanish, mostly one character represents one phoneme. For example, the dictionary 170 may include pronunciation dictionaries defining the phoneme-grapheme mappings for the pronunciation objects.

The flexible phoneme-grapheme mapping can allow the application of the conceptual approach of flexible speech-to-text conversion as disclosed herein to occur at different levels of granularity regarding the generated text elements. For example, the method 1000 can be applied to single characters, syllables, sentences, or paragraphs.

Referring to FIG. 2, a parameter determination component 150 determines a speed parameter for each grapheme (block 1500). The parameter determination component 150 determines the speed for each grapheme based on the phoneme-grapheme mapping results received from the alignment component 140 and by using the beginning and end times of the corresponding aligned phoneme or phoneme sequence. The speed parameter for a particular grapheme can reflect the time it takes to speak out the mapped phoneme(s) in the original audio speech signal. The speed parameter can also be considered a duration parameter describing how much time is spent on a particular portion of a spoken language (e.g., a character, a syllable, an entire word, a sentence, a paragraph, etc.).

Referring to FIG. 2, acoustic parameters for each mapped grapheme is determined (block 1600). The parameter determination component 150 receives as a further input the extracted acoustic feature values from the feature extractor 120. The parameter determination component 150 can then determine 1600 acoustic parameters for each grapheme by averaging the extracted acoustic feature values according to the beginning and end times of the corresponding phoneme or phoneme sequence. Thereby, averaging also includes any weighted averaging algorithm.

In some implementations, determining the acoustic parameters may include normalizing the acoustic parameters by applying respective acoustic normalization functions. In addition or in the alternative, determining the speed parameters may include normalizing the speed parameters by applying one or more speed normalization functions. The normalization functions may be provided by a normalizer sub-component 151 of the parameter determination component 150. Mean and variance values of the acoustic features and/or time (speed) information may vary between the phonemes. For example, a vowel can be significantly louder than a fricative and can have a wider range in loudness. In some implementations, the acoustic variation in the received audio speech signal can be visualized. Therefore, it may be advantageous to compensate for the different means and variances per phoneme before applying the feature values. For example, by normalizing each phoneme class (c) according to $pc=0.5+0.25*(pc-\mu c)/\sigma c$; where (p) denotes the acoustic and the time (speed) parameters, ($\mu$) represents the mean values, and ($\sigma$) the standard deviation, a homogeneous design providing the variation of each phoneme is emphasized. The mean and standard deviation can be calculated from a training set including various utterances by different speakers. To guarantee that the resulting parameters lie in the range of zero and one, the values can be normalized or/and truncated.

Referring to FIG. 2, for each character of the mapped graphemes, a character shape can be generated that represents the speed parameter and/or the acoustic parameters of the respective grapheme (block 1700). A generator component 160 can generate, for each character of the aligned graphemes, a character shape that represents the speed parameter and the acoustic parameters of the respective grapheme. For example, the generator 160 can include a visual shaping sub-component 162 configured to determine visual shaping parameters based on the normalized speed and acoustic parameters. Such visual shaping parameters can include, but are not limited to, vertical stroke weight, horizontal stroke weight, character width, character height, character contrast, character sharpness, character color, and character skewness. The visual shaping parameters can be used by the generator 160 to process, in real-time, a continuously scalable character in accordance with the visual shaping parameters. A graphical representation 20 of the generated character shape(s) can then be visualized to a user 10 who may interact with the computer system 100 via the interface 110 using respective I/O means (e.g., such as a LCD screen or any other appropriate monitor/display means (e.g., the display 126)). In addition, the graphical representation can be printed on non-electronic media, such as sheets, flyers, posters, walls etc. with variable material (e.g., paper, plastic, metal, wood, etc.).

Figure 3A:
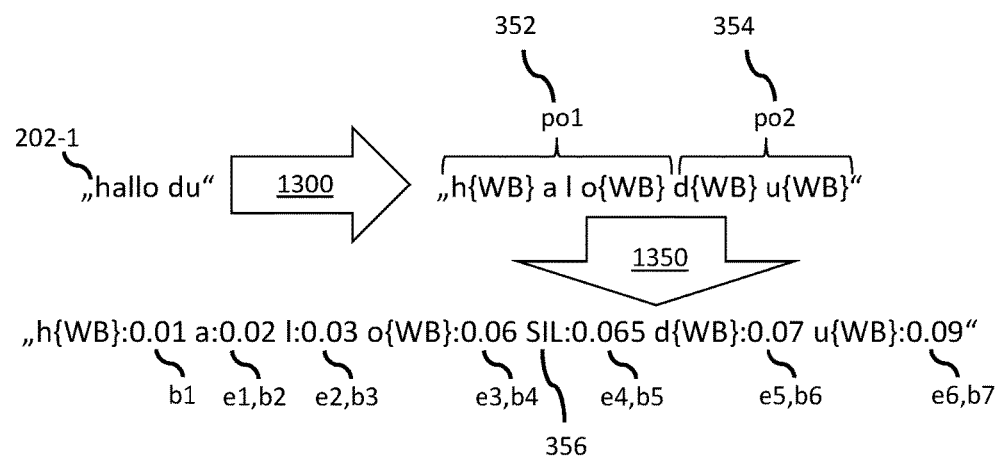
FIG. 3A is a diagram that illustrates an example of a segmentation of a speech signal.

FIG. 3A is a diagram that illustrates an example of a segmentation of a speech signal. For example, referring to FIG. 1, the segmentation component 130 receives transcription data (e.g., transcription data 116 (a transcription 202-1)) including the German words "hallo du" as a written representation of the spoken words in the received speech signal (e.g., audio speech signal(s) 201). The segmentation component (e.g., the segmentation component 130) can automatically map the written words of the transcription 202-1 of the audio speech signal to the units of corresponding pronunciation objects, the mapping shown in general by arrow 350 and, referring to FIG. 2, represented by block 1300. In the example shown in FIG. 3A, the segmentation component (e.g., the segmentation component 130) can use a pronunciation dictionary (e.g., the pronunciation dictionary 170) for generating the sequence of units (e.g., phonemes h, a, l, o, d, and u which are part of the pronunciation objects po1 352 (h a l o) and po2 354 (d u) by mapping the words in the transcription 202-1 to the corresponding pronunciation objects as defined by the pronunciation dictionary. With the word-by-word transfer of the written words to the written units, the first and last unit of the respective words may receive a word boundary tag {WB} which saves the corresponding word boundary information. Word boundary information (e.g., tags denoted as {WB}) can also be denoted in the unit sequences of the pronunciation objects in the pronunciation dictionary. The notion "h{WB} a l o{WB} d{WB} u{WB}" illustrates the unit sequence together with the word boundary information.

The segmentation component (e.g., the segmentation component 130) can automatically segment the audio speech signal (e.g., audio speech signal(s) 201) by mapping the corresponding units (phonemes h, a, l, o, d, u and a special phoneme SIL 356 as a marker for silence) to the received audio speech signal to determine a beginning time (b) and an end time (e) of the mapped units by using the internal clock included in the computer system (e.g., the internal clock 118 included in the computer system 100). The notation "h{WB}:0.01 a:0.021:0.03 o{WB}:0.06 SIL:0.065 d{WB}: 0.07 u{WB}:0.09" in the example includes an interval between a beginning time and an end time for a particular phoneme including the silence marker SIL after the ":" separator. The beginning time of the following phoneme corresponds to the end time of the previous phoneme. For the mapping of the various phonemes in the phoneme sequence to the respective parts of the speech signal, a forced alignment algorithm as disclosed herein may be used. The forced alignment algorithm can align the properties of the speech signal to respective phonemes. For example, the speech signal can be segmented based on the corresponding phonemes. The time points of the segment boundaries can be assigned to the respective phonemes.

FIG. 3B is a diagram that illustrates an example of a transformation of acoustic (speed) features into visual features. In the example shown in FIG. 3B, the received audio speed (acoustic) signal includes the spoken word "flight" which needs to be converted to a text representation that includes illustrating the acoustic features of loudness and pitch. In addition, the text representation takes into account a speed of the spoken language. For example, FIG. 3B shows three layers of processing, layer one 360, layer two 362, and layer three 364.

Layer one 360 illustrates acoustic (speed) feature values as vectors 301, 302, 303, and 304 which include, in this example, acoustic feature values for loudness and pitch, and also includes a parameter value for a speed parameter. As disclosed herein, referring to FIG. 1, the loudness and pitch feature values can be extracted from the audio speech signal 201 by the feature extractor 120. The speed parameter values can be determined by the parameter determination component 150 based on the respective beginning time and end time of the corresponding phonemes. By using the received transcription (e.g., the transcription data 116), the segmentation component 130 in combination with the pronunciation dictionary 170 can align the phonemes "f", "l", "ai", and "t" to the word flight in the received transcription (e.g., the transcription data 116), as illustrated by grapheme sequence 366 ("f", "l", "i", "g", "h", "t"). For each aligned phoneme, the segmentation component (e.g., the segmentation component 130) can determine a beginning time and an end time for association with each aligned phoneme that is mapped to (associated with) the respective feature vectors 301, 302, 303, and 304.

Layer two 362 illustrates the mapping (dotted lines) of the aligned phonemes to respective graphemes of the aligned word "flight" (as shown in a grapheme sequence 368). For generating the mapping, referring to FIG. 1, a grapheme alignment component (e.g., the alignment component 140) can use a corresponding pronunciation dictionary (e.g., the pronunciation dictionary 170) that can provide the information and data that the phoneme "f" is mapped to (aligned with) the grapheme "f", the phoneme "l" is mapped to (aligned with) the grapheme "l", the phoneme "ai" is mapped to (aligned with) the grapheme sequence "igh", and the phoneme "t" is mapped to (aligned with) the grapheme "t".

Layer three 364 illustrates how the acoustic (speed) feature values included in the feature vector 301 are transformed or mapped to corresponding visual features for each aligned grapheme. The visual features are illustrated as vectors 311, 312, 313, 314, 315, and 316. In the example shown in FIG. 3B, an acoustic loudness parameter can be transformed into a visual shaping parameter with a corresponding vertical stroke weight. An acoustic pitch parameter can be transformed into a visual shaping parameter with a corresponding horizontal stroke weight. A speed parameter can be transformed into a visual shaping parameter with an associated character width. In the example shown in FIG. 3B, visual shaping parameters have the same values as corresponding acoustic (speed) parameter values. In some implementations, a transformation function can be used that converts values according to predefined conversion (transformation) rules. The example shown in FIG. 3B illustrates that for the phoneme-grapheme mappings with a one-to-one mapping (e.g., f, l, t) the acoustic (speed) parameter vectors 301, 302, 304 of the respective phonemes are mapped to the visual feature vectors 311, 313, 316, respectively, of the corresponding graphemes. However, for the phoneme-grapheme mapping of "ai" to "igh", the respective acoustic (speed) parameter vector 303 is mapped to each of the visual feature vectors 313, 314, and 315 of the three corresponding graphemes.

Figure 4:
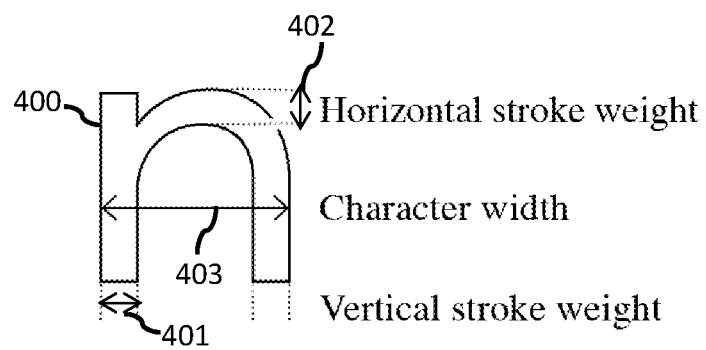
FIG. 4 is a diagram that illustrates an example of a continuously scalable character in accordance with visual shaping parameters.

FIG. 4 is a diagram that illustrates an example of a continuously scalable character 400 in accordance with visual shaping parameters 401, 402, and 403. The example shown in FIG. 4 illustrates the character "n" which can be modified with regards to its visual appearance to reflect the acoustic (speed) parameters. In the example shown in FIG. 4, the visual shaping parameters are horizontal stroke weight 402, character width 403, and vertical stroke weight 401. As described herein, additional and/or alternative visual shaping parameters may be defined.

For each character, which is used to represent the spoken language in text form, a reference shape is defined. The reference shape can be defined by a set of default visual shaping parameters for the character. The set of default visual shaping parameters can be selected to represent spoken language which is spoken at predefined acoustic (speed) parameters (e.g., at an average loudness, an average pitch, an average speed, without emotions, etc.). The visual shaping parameters can be adjusted whenever one or more of the acoustic (speed) parameters deviate from the predefined parameters.

Figure 5:
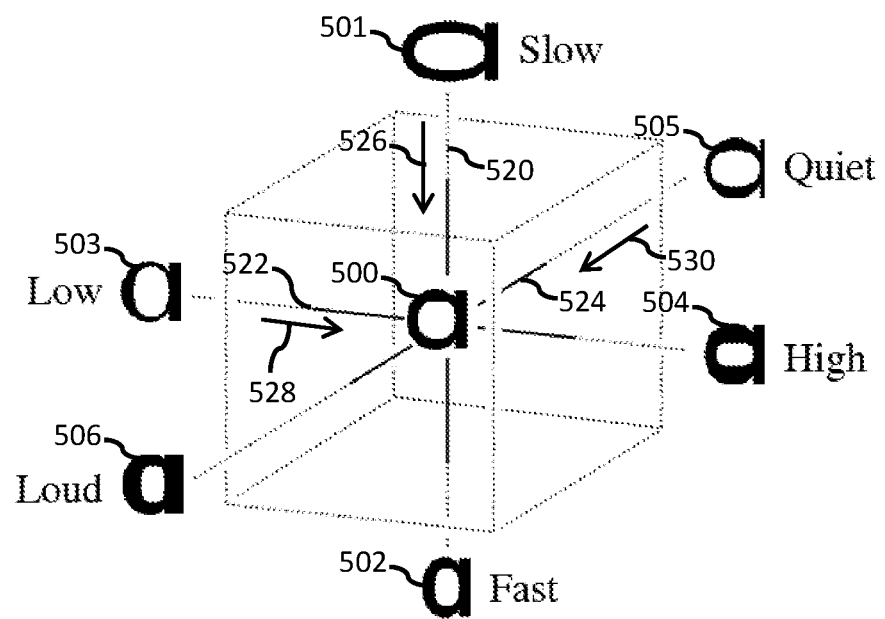
FIG. 5 is a diagram that illustrates different character shapes of an example continuously scalable character dependent (based) on acoustic (speed) parameters.

FIG. 5 is a diagram that illustrates different character shapes of an example continuously scalable character dependent (based) on acoustic (speed) parameters. The illustration of FIG. 5 explains in more detail an example of how visual parameters may be adjusted dependent on the respective acoustic (speed) parameters. For example, referring to FIG. 1, a generator component (e.g., the generator component 160) of a computer system (e.g., the computer system 100) can manipulate the visual shaping parameters of a continuously scalable character. In addition or in the alternative, a generator component (e.g., the generator component 160) can generate character shapes for a particular character that may be considered distorted when compared to a default shape for the character. The type and the degree of distortion can depend on the acoustic (speed) features (acoustic (speed) parameters) of a received audio speech signal (e.g., the audio speech signal(s) 201). For example, default shapes of characters may correspond to any available standard font, such as for example, Arial, Sans Serif, Calibri, etc. in a standard size (e.g., 14 point (14 pt.)).

In some implementations, the generator component (e.g., the generator component 160) can automatically select a standard size dependent (based) on a display output means (e.g., a display, a display device, a monitor, a TV screen, a touchscreen, the display 126) used by a user. In a first example, when a user is watching a TV transmission with subtitles, a font size (e.g., 36 pt.) may be selected to compensate for the distance between the user and the display (e.g., a TV screen). In a second example, a font size (e.g., 12 pt.) that is smaller than the font size used in the above first example may be selected (used) when a user is reading an e-book on a tablet computing device that may include a screen (e.g., a touchscreen, a display device) that can be smaller in size than the TV screen. For example, a diameter of a display included in the tablet computing device is less than a diameter of the TV screen. In addition or in the alternative, the distance between the user and the screen of the tablet computing device can be less than the distance between the user and the TV screen when viewing the displayed content contributing to the selection of the respective font sizes.

The visual shaping parameters used in the example of FIG. 5 can be the same visual shaping parameters as used in the example of FIG. 4. The visual shaping parameters can be mapped to respective acoustic (speed) parameters as shown in the example of FIG. 3B. The acoustic (speed) parameters are shown in the example of FIG. 5 as the three dimensions of a cube (dashed lines). A speed dimension can be characterized by a Slow-Fast dimension line 520. The processes of information transfer with speech and reading can occur within a certain time period. For example, a reader (user) can jump from a part of a word to a next part of a word. Increasing a character width can extend a scanning process of the eyes of the user. Therefore, in some implementations, a speed parameter of an utterance may be mapped to a character width.

A pitch dimension can be characterized by a Low-High dimension line 522. For example, high pitch levels can draw attention of a listener and express additional emotions, such as for example joy, anxiety, or fear, while medium pitch levels can account for more neutral attitudes.

A loudness dimension can be characterized by a Quiet-Loud dimension line 524. Producing loudness in speech can amplify an audio signal and can be used to obtain the attention of a listener.

In the example shown in FIG. 5, six example character shapes 501 to 506 of the character "a" are shown in relation to a reference character shape 500. For example, referring to the speed dimension as characterized by the Slow-Fast dimension line 520, when words are spoken fast a character width can be reduced (e.g., character shape 502) as compared to the reference shape 500. In cases where the words are spoken slowly, a character width can be increased (e.g., character shape 501) as compared to the reference shape 500. For example, referring to the loudness dimension as characterized by the Quiet-Loud dimension line 524, when words are spoken quietly a vertical stroke weight can be reduced (e.g., character shape 505) as compared to the reference shape 500. In cases where the words are spoken loudly, a vertical stroke weight can be increased (e.g., character shape shape 506) as compared to the reference shape 500. For example, referring to the pitch dimension as characterized by the Low-High dimension line 522, when words are spoken with a low pitch, a horizontal stroke weight can be reduced (e.g., character shape shape 503) as compared to the reference shape 500. In cases where the words are spoken with a high pitch, a horizontal stroke weight can be increased (e.g., character shape 504) as compared to the reference shape 500.

Although the examples in FIG. 5 show characters where only one visual shaping parameter is affected, the effects of multiple dimensions can be superposed in a single character shape. For example, if the acoustic (speed) parameter for the phoneme aligned with the grapheme "a" is determined to be loud, and high, and fast, a generated character shape can correspond to a merging of the character shape 502, the character shape 504, and the character shape 506 resulting in a character "a" with a narrow character width, an increased horizontal, and an increased vertical stroke weight. For example, the appearance of the character shape would resemble a horizontally compressed bold character "a".

The six example character shapes 501 to 506 may define extreme shapes of the character in each respective dimension (e.g., speed dimension, loudness dimension, and pitch dimension). Each visual shaping parameter can be normalized by mapping the extreme character shapes to corresponding extreme acoustic (speed) parameter values extracted from an audio speed signal. Each generated character shape can be within a range of the defined extreme character shapes for each dimension. Such a normalization can ensure that unreasonable distortions of a character that could result in unreadable character shapes can be avoided.

In addition or in the alternative, any other appropriate character distortion may be used to represent a dimension of the character. For example, when representing the loudness of a phoneme a character height can be modified. The visual shaping of an increase in loudness of an audio speech signal can then result in an increase in character height. As a result, in a text representation a character height can create an impression of crescendo and/or decrescendo indicators as used in the notation of music.

Character shape can also include visual features such as the color of the character. For example, a high pitch in an audio speech signal may result in a red color of the generated character shape and a low pitch in an audio speech signal may result in a blue color of the generated character shape. In addition or in the alternative, any other combination of colors allowing the distinction of pitch at a continuous scale may be used.

Figure 6:
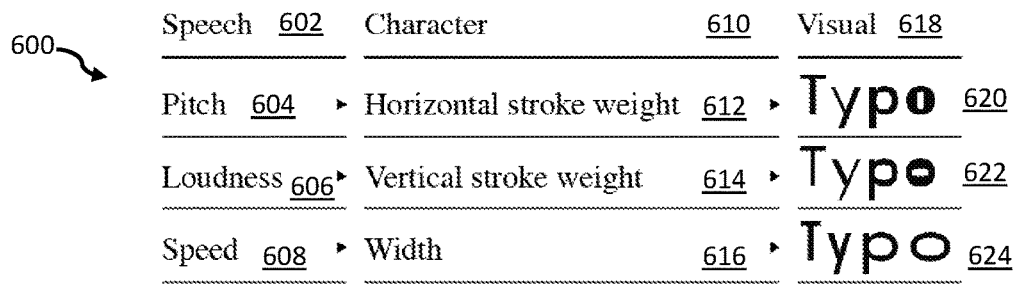
FIG. 6 is a diagram that illustrates an example of the influence of acoustic (speed) parameters on character shape.

FIG. 6 is a diagram that illustrates an example of the influence of acoustic (speed) parameters on character shape. Table 600 includes a Speech column 602 with the parameters (dimensions) pitch 604, loudness 606, and speed 608. Table 600 includes a Character column 610 with the corresponding visual shaping parameters of a horizontal stroke weight 612, a vertical stroke weight 614, and a character width 616. A Visual column 618 illustrates, for each dimension (parameter), the influence of change of the acoustic parameters on the visualization of the word "Typo".

In a pitch row 620, for example, a horizontal stroke weight of a character shape is increased with raising pitch parameter values from left to right. Referring to FIG. 5, a horizontal stroke weight of a character shape can increase along the Low-High dimension line 522 (arrow 528). In these cases, the Low-High dimension line 522 can be considered a vector.

In a loudness row 622, for example, a vertical stroke weight of a character shape is increased with increasing loudness parameter values from left to right. Referring to FIG. 5, a vertical stroke weight of a character shape can increase along the Quiet-Loud dimension line 524 (arrow 530). In these cases, the Quiet-Loud dimension line 524 can be considered a vector.

In a speed row 624, for example, a character width of a character shape is increased with decreasing speed parameter values from left to right. Referring to FIG. 5, a character width of a character shape can increase along the Slow-Fast dimension line 520 (arrow 526). In these cases, the Slow-Fast dimension line 520 can be considered a vector.

As described with reference to FIG. 5, the effects illustrated in the three rows (pitch row 620, loudness row 622, and speed row 624) of table 600 for each dimension separately may be superposed when generating character shapes for an audio speech signal where each phoneme can be associated with an acoustic (speed) parameter vector with more than one vector component being different from zero.

Figure 7A:
FIG. 7A is a diagram that illustrates an example of a generated character sequence with varying shapes.

FIG. 7A is a diagram that illustrates an example of a generated character sequence 700 with varying shapes. The generated character sequence corresponds to the Spanish word "atención". For example, the character shape based visualization of how a word is spoken out (pronounced) may be useful for learning new languages. The text representation can be used to illustrate intonation and accentuation in software and books for language learners. While the accented "o" in "atención" indicates an intonation of the "o" in the static text, one has no clue about the intonation in the beginning of the word. However, with the help of character shape based visualization of acoustic (speed) parameters, the stress of the "a" is conspicuous.

Based on the parameter set-ups of FIGS. 3B, 4, 5, and 6, for the reader of the generated character sequence 700 it can be apparent that the phonemes aligned to the graphemes "a", "i", and "o" were spoken slowly with a relatively loud voice at a relatively high pitch whereas the phonemes aligned to the grapheme sequence "ten" was spoken faster in a rather quiet voice with a lower pitch. The phoneme aligned with the last grapheme "n" was spoken in a relatively loud voice and with a relatively high pitch but much faster as compared to the speaking of the preceding "o". The example in FIG. 7A shows that a reader of the generated character sequence 700 can get a good perception of how the word "atención" was spoken without having heard the original audio speech signal. The reader can obtain this information by reading the generated character sequence 700 and interpreting the distorted character shapes accordingly. Hence, this improved display function of a computer system allows sensing of acoustic (speed) features in a spoken language even when an original audio speech signal is not available to a reader of the reshaped text (e.g., the generated character sequence 700) where the reshaped text (e.g., the generated character sequence 700) is generated based on the original audio speech signal.

The implementations described herein may also be applied to other fields where the correct pronunciation of words may be important. For example, in speech pathology, a generated character sequence can provide additional information about an original audio speech signal (the spoken word(s)) which may not be possible to do using the original audio speech signal (acoustic information). For example, a listener may not recognize a change in the loudness of a spoken word (within the spoken word). However, when visualizing the loudness parameter as part of a transcription of the original audio speech signal (a generated character sequence for the spoken word) the reader is enabled to see any loudness differences.

In another example, the problem of a reading disorder, which is primarily influenced by phonological awareness, may be reduced. Phonological awareness of an individual can refer to an awareness by the individual to a phonological structure of words. Phonological awareness can involve the detection and manipulation of sounds at three levels of sound structure: (1) syllables, (2) onsets and rimes, and (3) phonemes. Phonological awareness can also have an impact during the process of reading and writing. Individuals with an unsatisfactory phonological awareness are not able to extract the correct orthographic word out of a spoken utterance. The implementations described herein can provide a new way to visualize a comprehensible relationship between the spoken utterance and the written text.

In another example, subtitles on television (TV) screens can be popular in places where there is either a lot of background noise (e.g., in a gym, in transportation stations, at an airport) or where different programs are being simultaneously broadcasted (e.g., in sports bars where several football games, baseball games, basketball games, or other sporting events are being shown simultaneously on multiple display devices (e.g., TVs)). The subtitles may be switched on when TVs in these locations are displaying content. For example, a scene during a touchdown in a football game can be a very emotional experience for anyone who is a fan of the team and is excited by the sport. While a static subtitle does not transfer the commentator's emotion, a subtitle generating using the implementations described herein can reflect the commentator's admiration and enthusiasm about carrying the ball for over 80 yards.

In another example, the implementations described herein can be used to improve texting on mobile devices, such as a smartphone. In another example, the implementations described herein can be used to improve interaction with social networking and gaming applications. Additionally, automatic speech recognition can be used to automatically generate a text message and to automatically compose and send a voice. Emoticons can be used to help to meta-information to a text message to express irony and emotions. If it is not possible for a user to listen to a voice message, services can be provided for transcribing voice messages and sending the transcribed voice message back to the user in a text format. However, in the static text of the transcription, meta-information is lost and no emoticons are included in the text. By applying the described implementations to generated text messages transcribed from voice messages, the original emotions of the sender can be conveyed to the recipient of the text message.

Figure 7B:
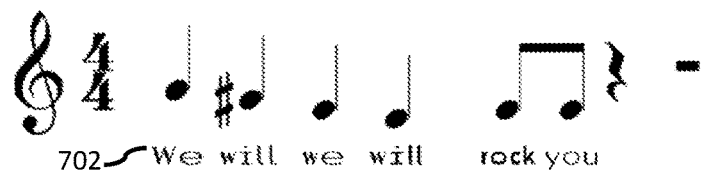
FIG. 7B is a diagram that illustrates an example implementation of a processing of a transcription of song lyrics.

FIG. 7B is a diagram that illustrates an example implementation of a processing of a transcription of song lyrics. The transcription of the song lyrics can be performed using the implementations described herein. The transcription of the song lyrics provides a text representation 702 including instructions about how to sing the song without the requirement of being able to read notes since loudness, pitch and speed are illustrated in a more comprehensible form and provide additional information to those who are able to read and interpret notes. For example, this may be useful for Karaoke applications or Karaoke TV transmissions to provide singers with additional information regarding the intonation of the lyrics.

FIG. 8 is a diagram that illustrates examples of visual representations of acoustic (speed) features. The upper section 801 of FIG. 8 shows a German sentence "Sei ruhig, bleibe ruhig, mein Kind" which is provided by an audio source to a speech-to-text conversion system according to implementations described herein. The written text is displayed using the default character shapes of the corresponding aligned graphemes.

Referring to FIG. 1, the written text can be displayed by the display 126. The lower section 802 of FIG. 8 illustrates results of a generator component (e.g., the generator component 160 as shown in FIG. 1) after having applied visual shaping parameters to the respective character shapes of the transcription data (e.g., the transcription data 116). In the example shown in FIG. 8, the German sentence is read eight times and by four different speakers. A first reading 820 and a second reading 822 by the same speaker are quite similar. A third reading 824 and a fourth reading 826 by a second speaker illustrates more pitch and more loudness 810 in the beginning of the sentence and more pitch 811 in the second part of the sentence. A third speaker provides a fifth reading 828 and a sixth reading 830 with a significantly lower voice 812. The last speaker provides the seventh reading 832 and the eighth reading 834 which are comparable to the second speaker. However, the third speaker say (speaks) the word "ruhig" at a lower speed 813.

Figure 9:
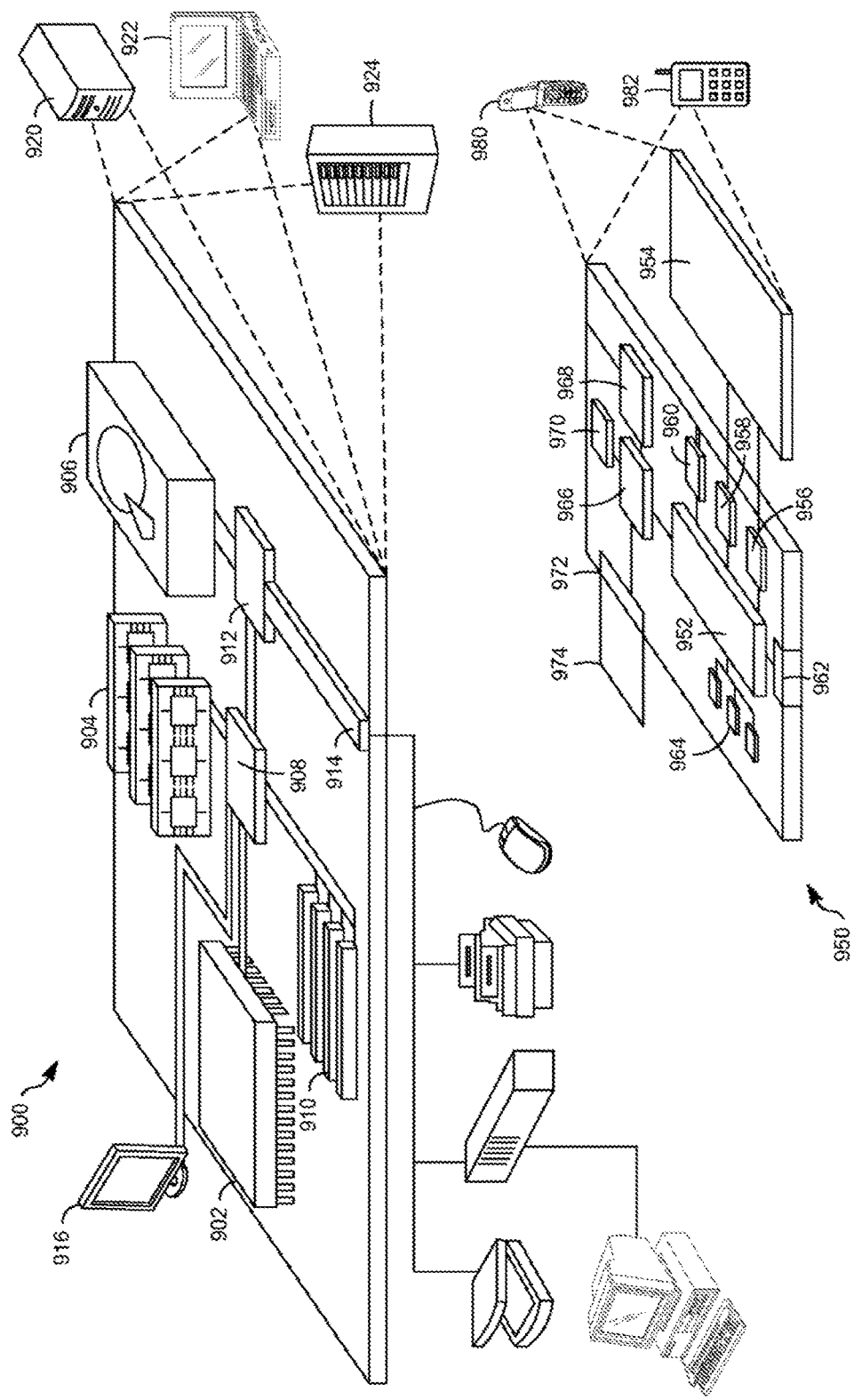
FIG. 9 is a diagram that shows an example of a generic computer device and a generic mobile computer device, which may be used to implement the techniques described herein.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. For example, generic computer device 900 may implement the computer system 100 of FIG. 1. Computing device 950 is intended to represent various forms of mobile devices, such as personal digital assistants, cellular telephones, smart phones, and other similar computing devices. For example, computing device 950 may be a smartphone or tablet computer, which may be used to provide an audio source. For example, mobile computer device 950 may also be used to implement the computer system 100 of FIG. 1. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other. For example, the client could provide the optional renderer for rendering the target image whereas the other components of the computer system 100 (see FIG. 1) may be implemented on a server.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for text generation based on an audio speech signal executed by one or more processors of a computer system, the method comprising:
   receiving, by the computer system, the audio speech signal;
   extracting acoustic feature values of the audio speech signal at a predefined sampling frequency;
   mapping written words of a transcription of the audio speech signal to units of corresponding pronunciation objects;
   segmenting the audio speech signal including mapping the units of corresponding pronunciation objects to the received audio speech signal to determine a beginning time and an end time of the mapped units;
   aligning one or more units of the corresponding pronunciation objects to one or more graphemes based on a unit-grapheme mapping;
   determining a speed parameter for each aligned grapheme by using the beginning time and the end time of the corresponding aligned one or more of the units of the corresponding pronunciation objects;
   determining at least one acoustic parameter for each aligned grapheme including averaging the extracted acoustic feature values according to the beginning time and the end time of the corresponding aligned one or more units of the corresponding pronunciation objects; and
   generating, for each character of the aligned graphemes, a character shape representative of the speed parameter, a character shape representative of the at least one acoustic parameter associated with the respective grapheme, or a character shape representative the speed parameter and the at least one acoustic parameter associated with the respective grapheme.

2. The method of claim 1,
   wherein determining the at least one acoustic parameter further comprises normalizing a plurality of acoustic parameters by applying respective acoustic normalization functions;
   wherein determining the speed parameter further comprises normalizing the speed parameter by applying a speed normalization function; and
   wherein generating the character shape further comprises determining visual shaping parameters based on the normalized speed and acoustic parameters.

3. The method of claim 2, wherein the visual shaping parameters include at least one of a vertical stroke weight, a horizontal stroke weight, a character width, a character height, a character contrast, a character sharpness, a character color, or a character skewness.

4. The method of claim 2, wherein the plurality of acoustic parameters include a loudness parameter, a pitch parameter, or a loudness parameter and a pitch parameter, and wherein generating the character shape further comprises any one of the following:
   in comparison with a reference character shape, increasing a vertical stroke weight of the character shape with increasing loudness parameter values;
   in comparison with the reference character shape, increasing a horizontal stroke weight of the character shape with raising pitch parameter values; and
   in comparison with the reference character shape, reducing a character width of the character shape with increasing speed parameter values.

5. The method of claim 2, wherein generating the character shape further comprises processing, in real-time, a continuously scalable character in accordance with the visual shaping parameters.

6. The method of claim 5, wherein processing the continuously scalable character occurs within predefined allowed value ranges for each visual shaping parameter.

7. The method of claim 1, wherein the unit-grapheme mapping is selected from one of a one-to-one mapping, a p-to-one mapping, a one-to-g mapping, and a p-to-g mapping, and wherein p and g are integer values greater than one.

8. The method of claim 1, wherein aligning one or more units of the corresponding pronunciation objects to one or more graphemes based on a unit-grapheme mapping further comprises:
   performing an automatic forced alignment process by aligning one particular unit to one or more corresponding graphemes, wherein the maximum number of corresponding graphemes is limited to a predefined integer; and
   wherein transforming at least one of acoustic parameters or the speed parameter of the one particular unit into visual shaping parameters of the one or more corresponding graphemes precedes generating the character shape.

9. The method of claim 1, wherein generating, for each character of the aligned graphemes, a character shape includes generating, for each character of the aligned graphemes, a character shape representative of the speed parameter.

10. The method of claim 1, wherein generating, for each character of the aligned graphemes, a character shape includes generating, for each character of the aligned graphemes, a character shape representative of the at least one acoustic parameter associated with the respective grapheme.

11. The method of claim 1, wherein generating, for each character of the aligned graphemes, a character shape includes generating, for each character of the aligned graphemes, a character shape representative of the speed parameter and the at least one acoustic parameter associated with the respective grapheme.

12. A computer program product having a set of computer readable instructions, which when loaded into a memory of a computer system and executed by one or more processors of the computer system, cause the computer system to perform text generation based on an audio speech signal with the steps of:
  receiving the audio speech signal;
  extracting acoustic feature values of the audio speech signal at a predefined sampling frequency;
  mapping written words of a transcription of the audio speech signal to units of corresponding pronunciation objects;
  segmenting the audio speech signal including mapping the units of corresponding pronunciation objects to the received audio speech signal to determine a beginning time and an end time of the mapped units;
  aligning one or more units of the corresponding pronunciation objects to one or more graphemes based on a unit-grapheme mapping;
  determining a speed parameter for each aligned grapheme by using the beginning time and the end time of the corresponding aligned one or more of the units of the corresponding pronunciation objects;
  determining at least one acoustic parameter for each aligned grapheme including averaging the extracted acoustic feature values according to the beginning time and the end time of the corresponding aligned one or more units of the corresponding pronunciation objects; and
  generating, for each character of the aligned graphemes, a character shape representative of the speed parameter, a character shape representative of the at least one acoustic parameter associated with the respective grapheme, or a character shape representative of the speed parameter and the at least one acoustic parameter associated with the respective grapheme.

13. The computer program product of claim 12,
  wherein determining the at least one acoustic parameter further comprises normalizing a plurality of acoustic parameters by applying respective acoustic normalization functions;
  wherein determining the speed parameter further comprises normalizing the speed parameter by applying a speed normalization function; and
  wherein generating the character shape further comprises determining visual shaping parameters based on the normalized speed and acoustic parameters.

14. The computer program product of claim 12, wherein the unit-grapheme mapping is selected from one of a one-to-one mapping, a p-to-one mapping, a one-to-g mapping, and a p-to-g mapping, wherein p and g are integer values greater than one.

15. The computer program product of claim 12, wherein automatically aligning one or more units of the corresponding pronunciation objects to one or more graphemes based on a unit-grapheme mapping further comprises:
  performing an automatic forced alignment process by aligning one particular unit to one or more corresponding graphemes, wherein the maximum number of corresponding graphemes is limited to a predefined integer; and
  wherein transforming at least one of acoustic parameters or the speed parameter of the one particular unit into visual shaping parameters of the one or more corresponding graphemes precedes generating the character shape.

16. A computer-implemented speech recognition system for generating text based on an audio speech signal, comprising:
  an interface component including an audio interface and a transcription interface, the interface component communicatively coupled to an audio source and a transcription source, the interface component configured to:
    receive the audio speech signal from the audio source via the audio interface, and
    receive a transcription of the audio speech signal from the transcript source via the transcription interface;
  a feature extraction component coupled to the interface component, the feature extraction component configured to:
    receive the audio speech signal from the interface component, and
    extract acoustic feature values of the audio speech signal at a predefined sampling frequency;
  a segmentation component coupled to the interface component, the segmentation component configured to:
    receive the audio speech signal and the transcription of the audio speech signal from the interface component,
    map written words of the transcription of the audio speech signal to units of corresponding pronunciation objects, and
    segment the audio speech signal including mapping the units of corresponding pronunciation objects to the received audio speech signal to determine a beginning time and an end time of the mapped units;
  a grapheme alignment component coupled to the segmentation component, the grapheme alignment component configured to:
    receive the units of corresponding pronunciation objects, and
    align one or more of the units of corresponding pronunciation objects to one or more graphemes based on a unit-grapheme mapping;
  a parameter determination component coupled to the grapheme alignment component, the parameter determination component configured to:
    receive aligned graphemes from the grapheme alignment component,
    determine a speed parameter for each aligned grapheme by using the beginning time and the end time of the corresponding aligned one or more of the units of corresponding pronunciation objects; and
    determine at least one acoustic parameter for each aligned grapheme including averaging the extracted acoustic feature values according to the beginning time and the end time of the corresponding aligned one or more of the units of corresponding pronunciation objects; and
  a generator component coupled to the parameter determination component, the generator component configured to:
    receive the aligned graphemes from the parameter determination component, and
    generate, for each character of the aligned graphemes, a character shape representative of the speed parameter, a character shape representative of the at least one acoustic parameter associated with the respective grapheme, or a character shape representative of the speed parameter and the at least one acoustic parameter associated with the respective grapheme.

17. The computer-implemented speech recognition system of claim 16, further including:
  a display device configured to display a visual representation of the generated character shapes.

18. The computer-implemented speech recognition system of claim 16, wherein the parameter determination component is further configured to:
- normalize a plurality of acoustic parameters by applying respective acoustic normalization functions;
- normalize the speed parameter by applying a speed normalization function; and
- determine visual shaping parameters based on the normalized speed and acoustic parameters.

19. The computer-implemented speech recognition system of claim 18, wherein the visual shaping parameters include at least one of a vertical stroke weight, a horizontal stroke weight, a character width, a character height, a character contrast, a character sharpness, a character color, or a character skewness.

20. The computer-implemented speech recognition system of claim 18, wherein the plurality of acoustic parameters include a loudness parameter, a pitch parameter, or a loudness parameter and a pitch parameter, and wherein generating the character shape further comprises any one of the following:
- in comparison with a reference character shape, increasing a vertical stroke weight of the character shape with increasing loudness parameter values;
- in comparison with the reference character shape, increasing a horizontal stroke weight of the character shape with raising pitch parameter values; and
- in comparison with the reference character shape, reducing a character width of the character shape with increasing speed parameter values.

* * * * *